Sept. 28, 1965   W. A. ALEXANDER ETAL   3,208,549
SEISMIC METHOD OF EARTH EXPLORATION
Filed June 1, 1962   3 Sheets-Sheet 1

ROBERT N. HART
WARREN A. ALEXANDER INVENTOR.

BY Gary C. Honeycutt
ATTORNEY

Sept. 28, 1965     W. A. ALEXANDER ETAL     3,208,549
SEISMIC METHOD OF EARTH EXPLORATION
Filed June 1, 1962                       3 Sheets-Sheet 3

ROBERT N. HART
WARREN A. ALEXANDER INVENTOR.

BY
ATTORNEY

United States Patent Office 3,208,549
Patented Sept. 28, 1965

3,208,549
SEISMIC METHOD OF EARTH EXPLORATION
Warren A. Alexander and Robert N. Hart, Tulsa, Okla., assignors, by mesne assignments, to Esso Production Research Company, Houston, Tex., a corporation of Delaware
Filed June 1, 1962, Ser. No. 199,295
5 Claims. (Cl. 181—.5)

This invention relates to a seismic method of earth exploration. The method involves a determination of both the compressional wave velocity and the shear wave velocity characteristic of various earth strata. In a specific embodiment it has been found that Poisson's ratio, which may be computed from these velocities, is indicative not only of the elastic properties of earth materials, but also indicative of certain geological and mineralogical features of the various subterranean strata.

Conventional methods of seismic prospecting involve a detonation of explosives near the surface of the earth at a series of stations, and the seismic waves reflected from subsurface horizons are recorded as a function of time at each of a series of detector stations. Knowing the travel times of these reflections and the velocity of seismic waves through the various beds involved, one may determine the variation in depth of each reflecting horizon from station to station.

Such knowledge is of great value in the search for petroleum deposits; however, it does not reveal, to any significant extent, the chemical and physical properties of each horizon. Accordingly, it is an object of this invention to supplement known techniques of earth exploration, by providing a method which is indicative of such properties, including a distinction between water-filled and petroleum-filled porous strata.

In its broadest aspect the present invention is a seismic method of earth exploration which comprises generating shear wave energy in the earth, generating compressional wave energy in the earth, and recording the respective travel times or velocities with which the said energy forms traverse a given region of the earth.

In another embodiment the method comprises generating shear wave energy in the earth, generating compressional wave energy in the earth, measuring the respective velocities with which the said energy forms traverse a given region of the earth, repeating these steps with respect to a different region of the earth, and comparing the velocities of one region with those of the other.

In a particular embodiment of the invention an array of vertically spaced, horizontally oriented geophones or other seismic detectors is secured to a borehole wall. A horizontally polarized shear wave is generated within the earth in the vicinity of the wellbore, and the arrival times of the shear wave at the respective detector locations are recorded. Thereafter, a compressional wave is generated in the same vicinity, and the arrival times of the compressional wave at the same respective detector locations are recorded. The array of detectors is then moved to a different level in the wellbore and the above steps are repeated. Finally, the shear and compressional velocities are computed for each interval and a record is prepared of Poisson's ratio, or some related function, versus borehole depth.

Poisson's ratio is the ratio of the change in width to the change in length of a solid body as load is applied. Metals and similar materials have a Poisson ratio from 0.19 to 0.27, but the published ratios for earth materials generally cover a much wider range. For sedimentary materials the ratios vary from about —0.3 to more than 0.4. There is also a wide variation between the published values obtained for similar materials, apparently because of differences in experimental techniques.

In a solid body the velocities of seismic waves, shear and compressional, are functions of the elastic constants and the density of the body. This relation is such that Poisson's ratio can be determined by measuring the velocities of travel times of shear and compressional seismic waves. The velocity of the shear seismic signal is given by the expression.

$$V_s = \sqrt{\frac{E}{\rho} \frac{1}{2(1+\sigma)}} \quad (1)$$

where
E is Young's modulus,
$\rho$ is the density of the material, and
$\delta$ is Poisson's ratio.

The velocity of the compressional signal is given by the expression $$V_p = \sqrt{\frac{E}{\rho} \frac{1-\sigma}{(1-2\sigma)(1+\sigma)}} \quad (2)$$

By combining these two expressions we have $$\frac{V_s}{V_p} = \sqrt{\frac{1-2\sigma}{2-2\sigma}} \quad (3)$$

And finally, solving for Poisson's ratio, $$\sigma = \frac{V_p^2 - 2V_s^2}{2(V_p^2 - V_s^2)} \quad (4)$$

It becomes evident therefore that Poisson's ratio can be computed for earth materials by determining the velocity of the compressional and shear signals and solving Expression 4.

A detailed description of a preferred embodiment of the method of the invention is provided by reference to the accompanying drawings.

Figure 1:
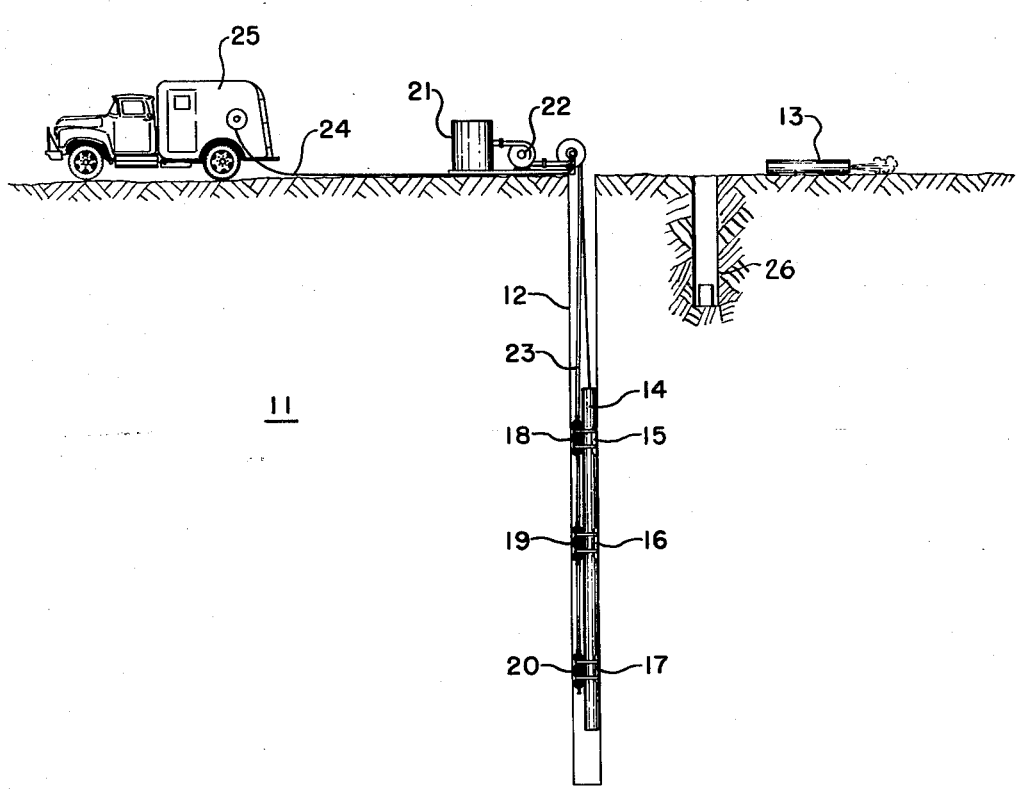
FIGURE 1 is a cross-sectional view of the earth, showing the relative positioning of the shear signal generator and geophone array for determining shear signal velocity in the vicinity of a borehole.

Referring particularly to FIGURE 1, a cross-sectional view of the earth 11 is shown, penetrated by borehole 12. The equipment shown includes a source of shear wave energy 13, a stiff rubber hose or equivalent means 14 containing geophones or other seismic detectors 15, 16 and 17 clamped therein, hydraulic packers 18, 19 and 20, fluid reservoir 21, pump 22 joined by hose or other conduit 23 leading to the hydraulic packers, and cable 24 leading from the geophone array to recorder truck 25.

Shear wave source 13 may be any device for imparting shear wave energy to the earth. An example of a suitable device is disclosed by R. N. Jolly, (Geophysics, vol. 21, Nov. 4, October 1956, p. 905). This device is a water cannon horizontally secured to the surface of the earth with eight steel stakes. About 20 to 30 grams of 60% dynamite is used for each explosive charge. The shear wave generated by this device is horizontally polarized.

Rubber hose 14 must have sufficient stiffness in order to maintain the array of three geophones oriented parallel to each other, and to maintain the geophones separated by a fixed distance.

A suitable example of a geophone or other seismic detector useful at each of positions 15, 16 and 17 is the Hall-Sears 3-component HS-J detector, combined into a twenty-foot array of three geophones oriented parallel to each other and clamped within member 14. This array permits orientation of the shear source parallel to one horizontal component of each geophone.

The three individual components of each Hall-Sears detector are mutually perpendicular, with two components lying in a horizontal plane, and the third being vertically aligned. The detectors must be firmly coupled to the borehole wall so that their horizontal components may respond properly to a shear event. Any of various conventional means for anchoring seismic detectors to a borehole wall may be used. Inflatable hydraulic packers 18, 19 and 20 are preferred for this purpose. The packers are inflated by the use of pump 22 which forces water or other fluid from reservoir 21 through hose 23.

The apparatus in truck 25 is any conventional equipment for preparing a record of the detector pulses, versus time, from which the wave velocities may be computed. Such apparatus is well known and readily available commercially.

In operation, the geophone array is lowered into the hole with the packers deflated. Then, at the proper depth the packers are inflated with water or other fluid by means of pump 22. A trial record is then made with the water cannon generating a shear signal in any convenient direction. This record gives an indication of how much the source needs to be rotated in order to be oriented parallel with one horizontal component of each geophone. This is an empirical procedure, which, however, usually involves no more than two trial runs in order that one of the horizontal detectors at each level will give large signals while the other will give very small or negligible signals.

After each shear record, compressional waves generated by small dynamite shots in shallow shot holes 26 are recorded before the geophones are moved to a next interval within the borehole, either above or below the previous level. The vertical components of the geophones record the down travelling compressional event which results from the dynamite shot. From these events the compressional velocity is computed. The packers are then deflated, the array is moved to the next interval, and the procedure for obtaining both the shear and compressional information is repeated.

Suitable alternate techniques for determining compressional velocities are well known. An example is disclosed in U.S. Patent 2,993,553.

Other known methods and equipment for determining shear velocities are disclosed in U.S. Patent 2,943,694, and in Geophysics, vol. XXVII, No. 2, pp. 237–241.

Figure 2:
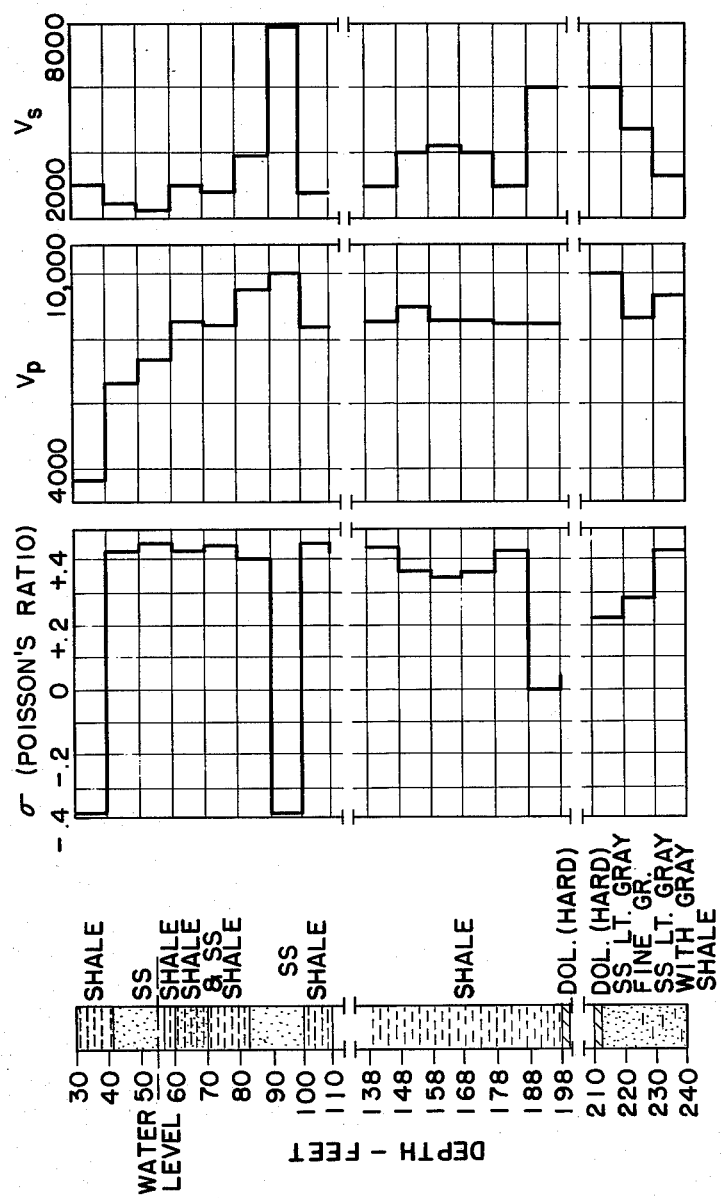
FIGURE 2 is a comparison of lithology with seismic properties based on an illustrative example operation in accordance with the present invention.

Referring now to FIGURE 2, the method of the invention is illustrated by data obtained from carrying out the invention in a borehole characterized by known lithology. Poisson's ratio is plotted versus borehole depth. For purposes of comparison, the compressional velocity data and the shear velocities are separately plotted versus borehole depth. This correlation of Poisson's ratio with the known lithology of the area logged confirms that the Poisson ratio of shale is high compared with that of sandstone. As a general rule, the shale has a Poisson ratio greater than 0.35 and the sandstone has values of less than 0.25. The correlation of a low Poisson ratio with sandstone in the interval from 90 to 100 feet is very pronounced. The predominantly shale interval between 138 to 198 feet has a consistently high Poisson ratio with the exception of the last 10 feet, which suggests that the ratio for this interval may be affected by its proximity to dolomite. The shear velocity shows a definite increase at this point, but the compressional velocity does not change.

The deepest interval logged, 210 to 240 feet, grades from sandstone toward shale. This changing lithologic character is directly indicated by the Poisson ratio which changes from 0.225 in the sandstone interval to 0.43 in the more shaly interval.

Figure 3:
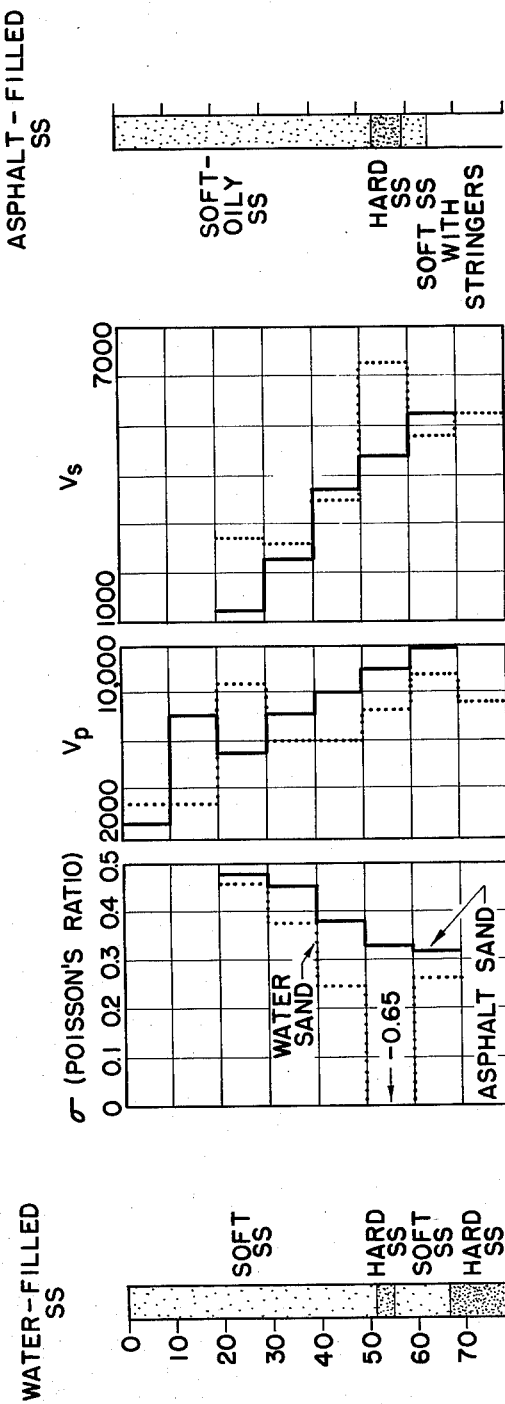
FIGURE 3 shows a correlation between the value of Poisson's ratio and the nature of fluids contained in certain porous earth formations.

Referring now to FIGURE 3, another aspect of the method is illustrated by data obtained from two other test boreholes, characterized by essentially the same lithology; the only difference between the two areas being the nature of the fluids which fill the porous formations surrounding the borehole. One area was water-filled whereas the other was asphalt-filled. The specific object of these tests was to see if this difference in fluids could be detected by seismic measurement of the Poisson ratio. Similarly as in FIGURE 2, the Poisson ratio is plotted versus borehole depth and the compressional and shear velocities are separately plotted versus borehole depth, for the purpose of comparison. It is significant that the higher Poisson ratios correlate with the asphaltic sandstone and the lower ratios with the water-filled sandstone. On the other hand, neither the compressional velocities nor the shear velocities show any consistent relation to the presence of the asphalt or of the water in the sandstone. The well defined difference in the Poisson ratios is attributed entirely to the different nature of the fluids contained in the sandstone pores. The mechanism by which the fluid content has this influence on the elastic properties of the material is not evident. However, it is suggested that it may be caused by the way in which the water and the oil have affected cementation of the rock.

Although the correlation illustrated is specifically limited to Poisson's ratio, it will be readily appreciated that numerous related functions of $V_s$ and $V_p$ bear a similar significance and therefore also have utility within the scope of the invention. For example, the simple ratio $V_s/V_p$ gives an adequate correlation for many purposes. It is within the scope of the invention to determine both $V_s$ and $V_p$ for a given path in the earth and to record any function of $V_s$ and $V_p$, versus depth within the earth.

What is claimed is:

1. A seismic method of earth exploration which comprises generating horizontally polarized shear wave energy at a first location in the earth, generating compressional wave energy at substantially the same location in the earth, detecting the arrival of the respective energies at a second location vertically spaced from said first location, and preparing a record of the respective travel times with which the said energy forms traverse the path between said first and second locations in the earth.

2. A seismic method of earth exploration which comprises generating horizontally polarized shear wave energy at a first location in the earth, generating compressional wave energy at substantially the same location in the earth, determining the respective velocities with which the said energy forms traverse a first vertical path in the earth, repeating the aforesaid steps with respect to a second vertical path within the earth, and preparing a record of said velocities versus depth in the earth.

3. A seismic method of earth exploration in the vicinity of a wellbore which comprises generating shear wave energy at a first location in the earth, generating compressional wave energy at substantially the same location in the earth, detecting and recording the arrival times of the respective energy forms at a plurality of vertically spaced locations within said wellbore, computing the respective velocities with which said energy forms traverse the respective distances between said first location and said vertically spaced location, and preparing a record of a function of said velocities, versus depth within the earth.

4. A method as defined by claim 3, wherein said function is Poisson's ratio.

5. A method of logging the lithologic character of subterranean strata surrounding a borehole which comprises the steps of generating a horizontally polarized shear wave at the surface of the earth near said borehole, generating a compressional wave near the surface of the earth in the vicinity of said borehole, detecting and recording the arrival times of the respective wave forms at a plurality of vertically spaced locations within said wellbore, computing the respective velocities with which said waves vertically traverse the earth surrounding said borehole, and preparing a record of a function of said velocities versus depth within the earth.

References Cited by the Examiner

UNITED STATES PATENTS

| | | | |
|---|---|---|---|
| 2,354,548 | 7/44 | Ricker | 181—.5 |
| 2,900,037 | 8/59 | Ellis | 181—.5 |

OTHER REFERENCES

American Institute of Physics Handbook, published by McGraw-Hill, 1957 (pp. 2–102 relied on).

SAMUEL FEINBERG, *Primary Examiner.*

CHESTER L. JUSTUS, *Examiner.*